Nov. 19, 1963 P. P. LIFLAND 3,111,481
LOW PRESSURE REFORMING WITH ONCE-THROUGH HYDROGEN
Filed Sept. 1, 1961 3 Sheets-Sheet 1

INVENTOR
Philip P. Lifland
BY
Francis Johnston
Agent

Nov. 19, 1963 P. P. LIFLAND 3,111,481
LOW PRESSURE REFORMING WITH ONCE-THROUGH HYDROGEN
Filed Sept. 1, 1961 3 Sheets-Sheet 2

Charge – $C_6$–250°F. Mid. Cont.
LHSV – 0.8
Pressure – 200 psig
Temperature – 960°F.

Hydrogen-to-Naphtha Mol Ratio

INVENTOR
Philip P. Lifland
BY
Francis J. Johnston
Agent

FIG. 3

INVENTOR
Philip P. Lifland
BY Francis F Johnston
Agent

United States Patent Office 3,111,481
Patented Nov. 19, 1963

3,111,481
LOW PRESSURE REFORMING WITH ONCE-THROUGH HYDROGEN
Philip P. Lifland, Woodbury, N.J., assignor to Socony Mobil Oil Company, Inc., a corporation of New York
Filed Sept. 1, 1961, Ser. No. 135,644
25 Claims. (Cl. 208—79)

The present invention relates to reforming naphtha at low reaction pressure of less than 400 pounds per square inch gauge (400 p.s.i.g.) in the presence of particle-form platinum-group metal reforming catalyst without recycle of reformer gas from the liquid-gas separator of the low pressure reforming unit to the reactor(s) or reaction zone(s) of the low pressure unit but in the presence of not more than 3.5 mols of "once-through" hydrogen per mol of naphtha.

A recent survey of a number of low pressure units operating indicated that there are 17 non-regenerative and/or occasionally regenerative units employing platinum-group metal reforming catalyst and recycle ratios of 4 to 10 mols of hydrogen per mol of naphtha when producing $C_5$ and heavier reformate ($C_5+$ reformate) having octane ratings of 90 to 101+(R+3 cc. TEL). The same survey established that there are 146 low pressure cyclic regenerative units employing platinum-group metal reforming catalyst and recycle ratios of 3 to 10 mols of hydrogen per mol of naphtha when producing $C_5+$ reformate having octane ratings (research+3 cc. TEL) of 95 to 106 (Wiese). There is also one unit employing molybdenum oxide reforming catalyst in a cyclic regenerative process for producing $C_5+$ reformate having octane ratings (research clear) of 77 to 93 in which 1.6 to 6 mols of hydrogen per mol of naphtha are recycled. In addition, 32 units employing bauxite as the reforming catalyst operating in a cyclic regenerative manner to produce $C_5+$ reformate having octane ratings (research+3 cc. TEL) of 73 to 86 with no recycle of hydrogen have ceased operating in recent years. In addition to the foregoing units, there are six continuously regenerative low pressure units employing a mixture of oxides of cobalt and molybdenum or oxide of molybdenum alone as the reforming catalyst with recycle of 3 to 10 mols of hydrogen per mol of naphtha to produce $C_5+$ reformate having octane ratings (research+3 cc. TEL) of up to 100.

When producing $C_5+$ reformate having an octane rating (research+3 cc. TEL) of at least 100 at low pressures from $C_6$ to 380° F. fraction of Mid-Continent naphtha the concentration of hydrogen in the hydrogen-containing gas varies from about 85 mol percent when producing 100 octane $C_5+$ reformate to about 60 mol percent when producing 110 octane $C_5+$ reformate. Therefore to recycle 3 to 10 mols of hydrogen per mol of naphtha feed in a unit treating 10,000 barrels per day or 417 barrels per hour of naphtha the volumes of gas set forth in Table I must be recompressed and pumped from the liquid-gas separator to the reaction zone(s) or reactor(s).

Table I

| Octane No. $C_5+$ Reformate (R+3 cc. TEL) | Mol percent $H_2$ in Reformer Gas | Standard cu. ft. of hydrogen per bbl. of Naphtha at Mol Ratio of— | | | Standard cu. ft. reformer Gas per bbl. of Naphtha at Mol Ratio of— | | |
|---|---|---|---|---|---|---|---|
| | | 3/1 | 7/1 | 10/1 | 3/1 | 7/1 | 10/1 |
| 100 | 85 | 2,580 | 6,025 | 8,600 | 3,035 | 7,090 | 10,115 |
| 105 | 75 | 2,580 | 6,025 | 8,600 | 3,440 | 8,035 | 11,465 |
| 108 | 67 | 2,580 | 6,025 | 8,600 | 3,850 | 8,990 | 12,835 |
| 110 | 60 | 2,580 | 6,025 | 8,600 | 4,300 | 10,040 | 14,330 |

In high pressure reforming at, for example, 500 p.s.i.g. 3,440 to 11,465 cubic feet of reformer gas per barrel are circulated from the liquid-gas separator to the reaction zone(s) or reactor(s) at recycle ratios of about 3 to about 10 mols of hydrogen per mol of naphtha when the reformer gas contains 75 mol percent of hydrogen.

Figure 1A:
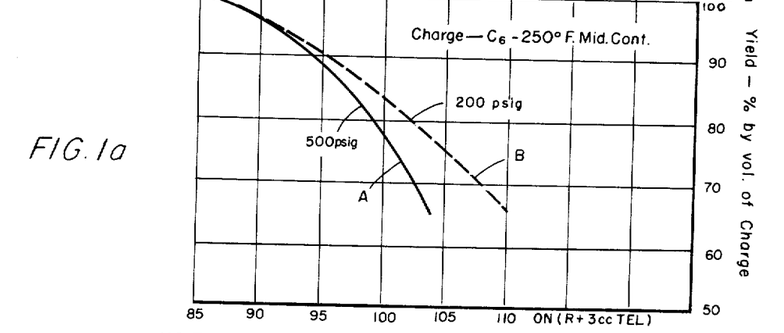
Figure 1B:
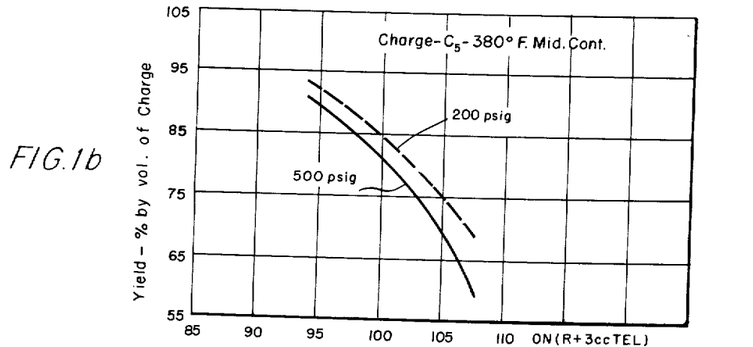
Figure 1C:
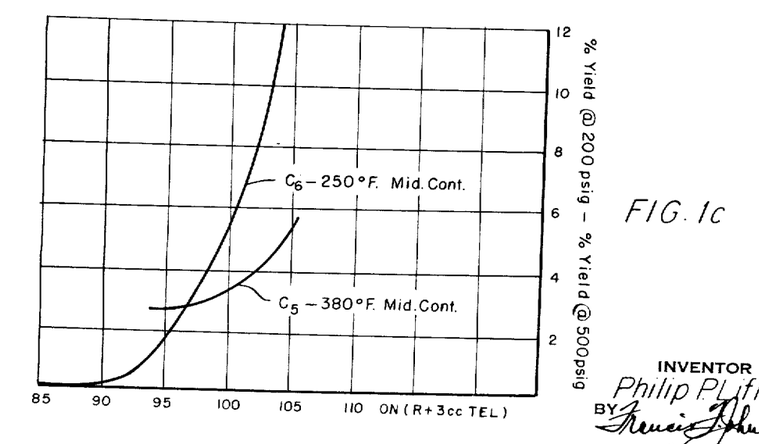

The yield of $C_5+$ reformate is increased an industrially important amount when reforming in the presence of platinum reforming catalyst at 200 p.s.i.g. compared to the yield of $C_5+$ reformate when reforming in the presence of platinum reforming catalyst at 500 p.s.i.g. This is illustrated graphically in FIGURES 1A, 1B, and 1C. The yields of $C_5+$ reformate from the $C_6$ to 250° F. fraction of Mid-Continent naphtha at 200 p.s.i.g. and at 500 p.s.i.g. when the $C_5+$ reformate produced has octane ratings (R+3 cc.) of 85 to 110 are graphically presented in FIGURE 1A. The same relation for the $C_5+$ reformate produced from the full boiling range, i.e., $C_5$ to 380° F. Mid-Continent naphtha is illustrated in FIGURE 1B. The increase in yield for both the fraction of the full boiling range naphtha and for the full boiling range naphtha have been plotted in FIGURE 1C. It will be observed that, while the increase in yield when reforming the $C_5$ to 380° F. full boiling range naphtha is only about 2.7 to 5.5 percent dependent upon the octane rating of the $C_5$ and heavier reformate, when reforming the $C_6$ to 250° F. fraction the increase can be as much as 12 percent.

Were it possible to eliminate or markedly reduce the volume of hydrogen circulated from the liquid-gas separator to the reaction zone(s) when reforming at pressures of the order of 200 p.s.i.g. the capital costs for the reformer gas circulating system could be reduced or eliminated together with the operating and maintenance costs. In a 10,000 barrels per day unit without recycle of hydrogen-containing gas the capital cost is $800,000 less than for a unit in which hydrogen-containing gas is recycled to maintain a hydrogen-to-naphtha mol ratio of 7 to 1 and is $400,000 less than for a unit in which hydrogen-containing gas is recycled to maintain a hydrogen-to-naphtha mol ratio of 4 to 1.

Figure 2A:
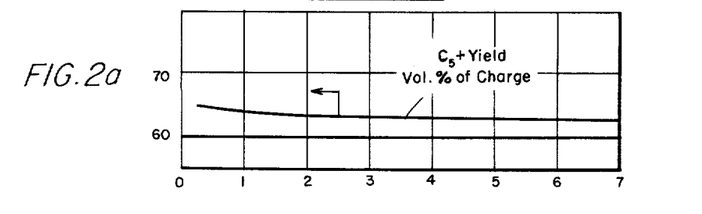
Figure 2B:
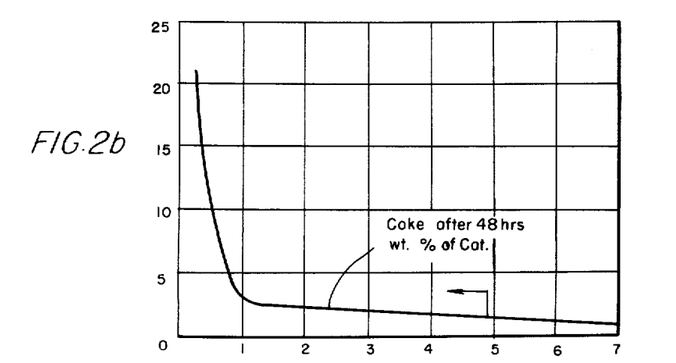
Figure 2C:
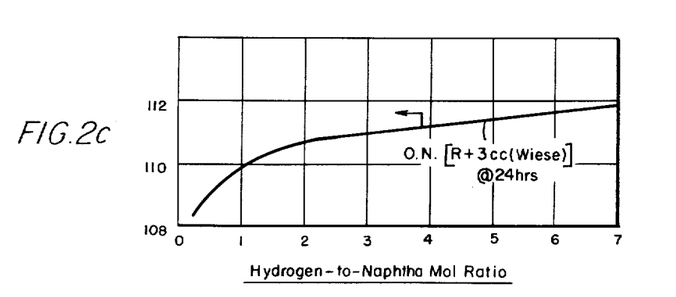

It has been found (as graphically illustrated in FIGURES 2A, B and C) that when reforming the $C_6$ to 250° F. fraction of Mid-Continent naphtha at reaction pressures less than 400 p.s.i.g., for example, 200 p.s.i.g., to produce $C_5+$ reformate having octane ratings (R+3 cc.) of 108 to 112 (Wiese) that the yield of $C_5+$ reformate is not reduced in an industrially important amount by reducing the hydrogen-to-naphtha mol ratio from 10 to 1 to 3 to 1 or less, for example, 0.25 to 1. It has also been found that even at the low hydrogen-to-naphtha mol ratio of 0.25 to 1 the amount of carbonaceous material laid down on the catalyst in 48 hours when producing $C_5+$ reformate having octane ratings (R+3 cc.) of 108 to 112 (Wiese) does not exceed the amount of such deposit which can be burned off in 12 hours. Thus, a cyclic regenerative method of reforming naphtha at low pressure, i.e., less than 400 p.s.i.g., e.g., at 200 p.s.i.g. becomes industrially practicable with the advantages noted hereinbefore when hydrogen or hydrogen-containing gas is available in the quantities required.

A suitable source of hydrogen in the quantity required is a high pressure reforming unit. However, it is to be noted that a high pressure reforming unit employing platinum-group metal reforming catalyst produces about 670 to about 700 standard cubic feet of hydrogen per barrel of feed when reforming the 250° to 380° F. fraction of Mid-Continent naphtha to produce $C_5+$ reformate having octane ratings (R+3 cc.) of 95 to 110 (Wiese). On the other hand, the $C_6$ to 380° F. Mid-Continent naphtha when reformed in the presence of the same catalyst to produce $C_5+$ reformate having the same octane ratings, produces about 640 to about 660 cubic feet of hydrogen per barrel of feed. The amounts of hydrogen produced from various feed stocks when producing $C_5+$ reformates having octane ratings (R+3 cc.) of at least 95 in a high pressure reforming unit are tabulated hereinafter.

reactors in the low pressure reforming unit but can be used in other processes at substantially the same, at lower, or at higher pressures than that of the low pressure reforming unit liquid-gas separator.

*Table II*

| Charge to High Pressure Reforming Unit | Standard cu. ft. of Hydrogen Produced per bbl. of Charge to High Pressure Unit When Producing $C_5+$ Reformate Having Indicated Octane Rating (R+3 cc.) (Wiese) | | | | Equivalent Mols of $H_2$ per bbl. of Charge at 379 s.c.f. per Mol | | | |
|---|---|---|---|---|---|---|---|---|
| | 95 | 100 | 105 | 110 | 95 | 100 | 105 | 110 |
| $C_6$ to 380° F. Mid-Eastern [1] | 400 | 440 | 500 | -------- | 1.06 | 1.16 | 1.32 | -------- |
| 250° to 380° F. Mid-Eastern [2] | 490 | 570 | 670 | -------- | 1.29 | 1.51 | 1.77 | -------- |
| $C_6$ to 380° F. Mid-Cont.[3] | 640 | 790 | 840 | 660 | 1.69 | 2.09 | 2.22 | 1.74 |
| 250 to 380° F. Mid-Cont.[4] | 670 | 810 | 860 | 700 | 1.77 | 2.14 | 2.27 | 1.85 |
| $C_7$ to 380° F. Wilmington [5] | 850 | 1,050 | 1,100 | 1,060 | 2.24 | 2.77 | 2.90 | 2.80 |
| 250° to 380° F. Wilmington [6] | 860 | 1,070 | 1,120 | 1,090 | 2.27 | 2.83 | 2.96 | 2.88 |

[1] 24% naphthenes.  [2] 26% naphthenes.  [3] 45% naphthenes.  [4] 45% naphthenes.  [5] 59% naphthenes.
[6] 60% naphthenes.

Accordingly, the present method provides for reforming $C_5$ to 380° F. or $C_6$ to 380° F. fraction of naphtha containing naphthenes and paraffins in a high pressure unit, i.e., at reaction pressure in excess of 400 p.s.i.g. whilst reforming $C_5$ to 380° F. or $C_6$ to 380° F. naphtha in a low pressure unit, i.e., at reaction pressure less than 400 p.s.i.g. The present invention also provides for reforming the 250° to 380° F. fraction of straight run naphtha in a high pressure unit whilst reforming the $C_5$ or $C_6$ to 250° F. fraction of naphtha in a low pressure unit. Both the low pressure and the high pressure reforming units preferably employ static beds of particle-form platinum-group metal reforming catalyst. Presently preferred is the platinum-group metal reforming catalyst comprising about 0.35 to about 0.6 percent by weight of platinum and about 0.4 to about 0.7 percent by weight of chlorine on a support comprising alumina. The on-stream time between regenerations in the low pressure unit is at least 48 hours and can be the interval during which the amount of carbon deposited on the catalyst does not exceed about 21 percent of the weight of the catalyst employed in the low pressure unit. The on-stream time between regenerations in the high pressure unit can be any time in excess of two months as for example three months, a year, or even two years if inspection of the unit is not required in less than a year or there are no causes other than the unforeseen deactivation of the catalyst, requiring the cessation of operation of the high pressure unit. The "once-through" hydrogen-to-naphtha mol ratio in the low pressure unit is not greater than 3.5:1 and can be as low as 0.25:1 although it is preferred to maintain a once-through hydrogen-to-naphtha mol ratio of 0.5 to 3:1 in the low pressure unit.

The present invention provides for (1) introducing all of the gas made in the high pressure reforming unit into the pretreater, scrubbing the pretreater off-gas to remove hydrogen sulfide and ammonia therein and introducing the scrubbed pretreater off-gas into the low pressure reforming unit to maintain the once-through hydrogen-to-low pressure feed naphtha mol ratio of 0.25 to 3.5:1, (2) introducing a portion of the gas made in the high pressure reforming unit into the pretreater and "venting" the pretreater off-gas, introducing the balance of the gas made in the high pressure reforming unit into the low pressure reforming unit to maintain the aforesaid once-through hydrogen to low pressure feed naphtha ratio, and (3) introducing a portion of the gas made in the high pressure reforming unit into the pretreater, introducing the balance of the gas made in the high pressure reforming unit into the low pressure reforming unit and also introducing sufficient scrubbed pretreater off-gas into the low pressure reforming unit to maintain the aforesaid once-through hydrogen-to-low pressure feed naphtha ratio. The off-gas from the low pressure reforming unit is not recycled to the The high pressure reforming unit is operated at a hydrogen-to-naphtha mol ratio of 1 to 20 with recycle of reformer gas after separation of the gas made in the high pressure unit, hereinafter designated excess high pressure reformer gas. In general, the conditions in the high pressure and low pressure reforming units are those set forth in Table III.

*Table III*

HIGH PRESSURE UNIT

Feed:
   $C_5$ to 380° F. naptha, or
   $C_6$ to 380° F. Naptha, or
   250°–380° F. fraction of naphtha (naphtha can be straight run, catalytically cracked, thermally cracked, or a mixture of two or more).
Catalyst: Platinum-group metal reforming catalyst; preferably comprising 0.35 to 0.6 percent by weight of platinum; 0.4 to 0.7 percent by weight of chlorine on support comprising alumina.

| Operating Conditions | Broad | Preferred |
|---|---|---|
| Pressure, p.s.i.g | 450 to 1,200 | 500 to 700. |
| Hydrogen/Naphtha Mol Ratio | 1 to 20 | 6 to 10. |
| LHSV [1] | 0.5 to 5 | 1 to 2. |
| $C_5+$ Octane Number (R+3 cc.)[2] | 85 to 115 | 90 to 110. |

LOW PRESSURE UNIT

Feed:
   $C_5$ to 380° F. naphtha, or
   $C_6$ to 380° F. naphtha, or
   $C_6$ to 250° F. fraction of naphtha (straight run, catalytically cracked, thermally cracked, or a mixture of two or more).
Catalyst: Platinum-group metal reforming catalyst; preferably comprising 0.35 to 0.6 percent by weight of platinum, 0.4 to 0.7 percent by weight of chlorine on support comprising alumina.

| Operating conditions | Broad | Preferred |
|---|---|---|
| Pressure, p.s.i.g | 0 to 400 | 100 to 300. |
| Hydrogen/Naphtha Mol Ratio | 0.25 to 3.5 | 0.5 to 3. |
| LHSV [1] | 0.25 to 3 | 0.5 to 2. |
| $C_5+$ Octane Number (R+3 cc.)[2] | 85 to 115 | 90 to 110. |
| On stream between regenerations | Time required to deposit carbon in the amount of not more than 21% of the weight of the catalyst. | Not less than 48 hours. |

[1] LHSV—Liquid Hourly Space Velocity, v./hr./v.
[2] Octane numbers in excess of 100 on the Wiese scale.

The present invention provides for reforming a portion of a $C_5$ to 380° F. (E.B.P.) naphtha containing not more than innocuous concentrations of sulfur, nitrogen, and arsenic at a low pressure of not more than 40 p.s.i.g. and reforming the balance of the aforesaid $C_5$ to 380° F. naphtha at high pressure (500 p.s.i.g. or more) employing a hydrogen-to-naphtha mol ratio of once-through hydrogen of 0.25 to 3.5:1 in the low pressure section or stage and a hydrogen-to-naphtha mol ratio of recycled hydrogen of 1 to 20:1 in the high pressure section or stage and supplying any hydrogen required to maintain a once-through hydrogen-to-low pressure feed naphtha mol ratio of 0.25 to 3.5:1 in the low pressure section from the excess hydrogen or hydrogen produced, i.e., make-gas, in the high pressure section or stage. The present invention also provides for reforming the $C_5$ to 250° F. fraction of a $C_5$ to 380° F. (E.B.P.) naphtha containing innocuous concentrations of sulfur, nitrogen, and arsenic at a low pressure of not more than 400 p.s.i.g. and reforming the 250° to 380° F. fraction of the aforesaid $C_5$ to 380° F. naphtha at high pressure (500 p.s.i.g. or more) employing the respective hydrogen-to-naphtha mol ratios set forth hereinbefore and supplying hydrogen to the low pressure stage as described hereinbefore.

The present invention likewise provides for hydrodecontaminating, i.e., hydrodesulfurizing and hydrodenitrogenizing, and removing arsenic from naphthas including straight run naphtha, thermally cracked naphtha, catalytically cracked naphtha, and mixtures of two or more of the foregoing naphthas to provide a hydrodecontaminated naphtha containing not more than innocuous concentrations of sulfur, nitrogen, and arsenic. A portion of the hydrodecontaminated $C_5$ to 380° F. naphtha is reformed at a pressure not greater than 400 p.s.i.g. and the balance of the hydrodecontaminated naphtha is reformed at a pressure of at least 500 p.s.i.g. or the $C_5$ to 250° F. fraction of the hydrodecontaminated naphtha is reformed at a pressure not greater than 400 p.s.i.g. while the 250° to 380° F. fraction of the hydrodecontaminated naphtha is reformed at a pressure of at least 500 p.s.i.g. In the low pressure stage as described before the hydrogen-to-naphtha mol ratio of once-through hydrogen is 0.25 to 3.5:1 and in the high pressure stage the hydrogen-to-naphtha mol ratio of recycle hydrogen is 1 to 20:1. Similarly, any hydrogen extraneous to the low pressure stage required therein is supplied to the low pressure section from the hydrogen produced in the high pressure section.

Furthermore, the present invention provides for reforming one $C_5$ or $C_6$ to 380° F. naphtha or the $C_5$ or $C_6$ to 250° F. fraction thereof at a pressure of not more than 400 p.s.i.g. while reforming another $C_5$ or $C_6$ to 380° F. naphtha or the 250° to 380° F. fraction thereof at a pressure of at least 500 p.s.i.g. In each instance the feed to the reforming units contains not more than innocuous concentrations of sulfur, nitrogen, and arsenic. In each instance any hydrogen required to maintain a hydrogen-to-naphtha mol ratio of once-through hydrogen of 0.25 to 3.5:1 in the low pressure stage is supplied from the hydrogen produced in the high pressure stage. Thus, in general, the feed for the high pressure reforming stage or section, i.e., the stage or section operating at a pressure of at least 500 p.s.i.g., is selected to produce, at the reforming conditions of temperature and space velocity in the high pressure stage, hydrogen in the volume required to provide once-through hydrogen extraneous to the low pressure stage or section in the volume necessary to maintain a hydrogen-to-naphtha mol ratio of 0.25 to 3.5:1 in the low pressure stage.

Innocuous concentrations of sulfur, nitrogen, and arsenic are as follows: Not more than 150 p.p.m. (150 parts per million) of sulfur, not more than 1 p.p.m. (one part per million) of nitrogen, and not more than 2 p.p.b. (two parts per $10^9$) of arsenic. Preferably, the naphtha to be reformed in the presence of arsenic-sensitive reforming catalyst such as platinum-group metal reforming catalyst is essentially free from arsenic. As used herein, "essentially free from arsenic" designates a concentration of arsenic in a reformer feed which, when said reformer feed is contacted with a static bed of reforming catalyst comprising 0.35 percent by weight of platinum, is insufficient to deactivate said catalyst within the life of the catalyst, for example, two years, as determined by other factors such as temperature required to produce a reformate having an octane rating of at least 100 (R+3 cc.), the yield of reformate, and the mechanical strength of the catalyst.

When the only naphthas available are those containing in excess of the aforesaid innocuous concentration of one or more of the contaminants sulfur, nitrogen, and arsenic, the entire charge is pretreated. On the other hand, when naphtha is available which contains not more than the aforesaid innocuous concentrations of the contaminants sulfur, nitrogen, and arsenic, the feed to either or both of the reforming units can be at least in part the naphthas which without pretreating contain not more than the aforesaid innocuous concentrations of sulfur, nitrogen, and arsenic.

Figure 3:
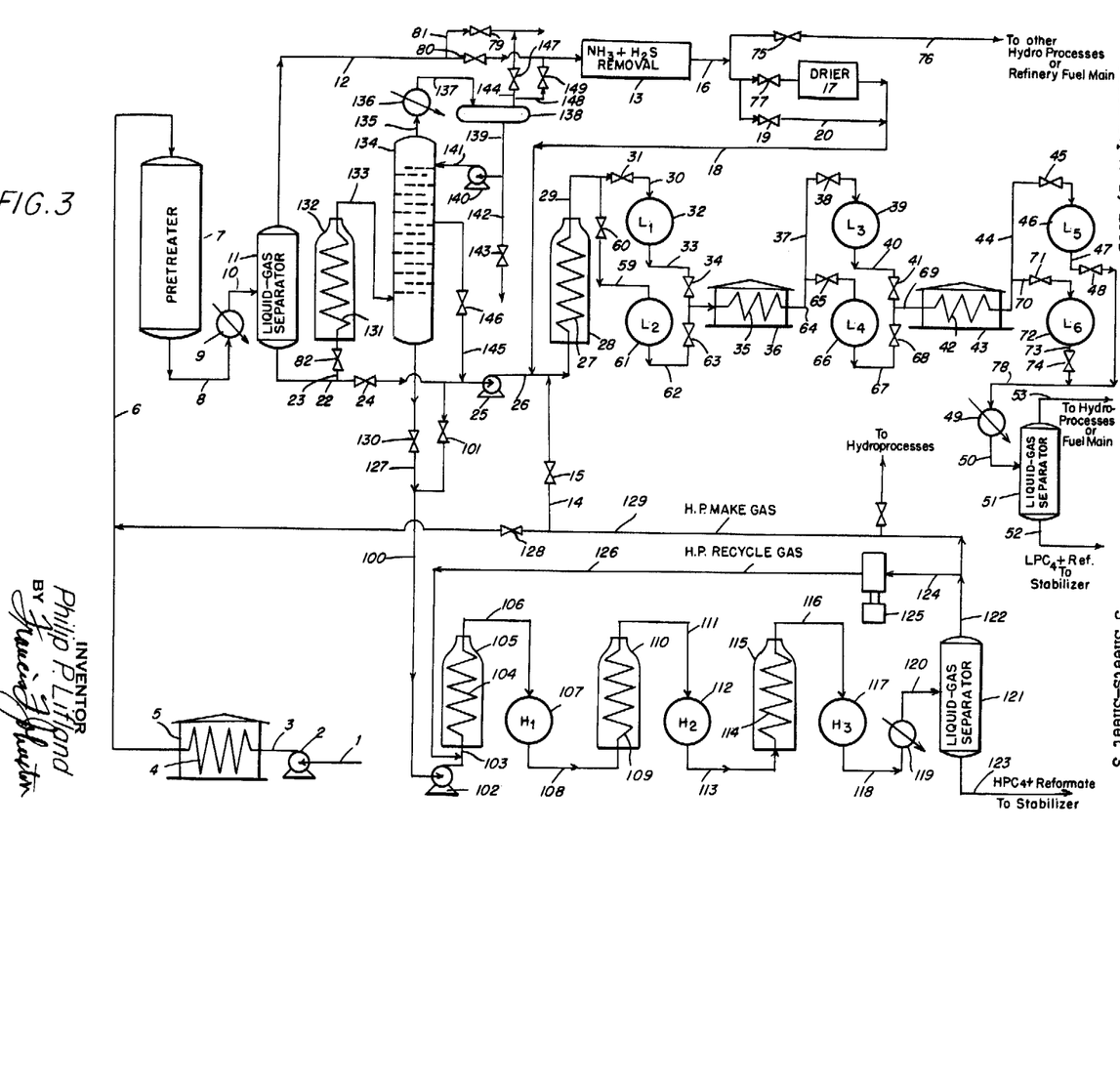

The present invention provides for charging to both the low pressure reforming unit and to the high pressure reforming unit a $C_5$ to 380° F. fraction or a $C_6$ to 380° F. fraction of naphtha containing not more than innocuous concentrations of sulfur, nitrogen, and arsenic. Alternatively, a $C_5$ to 250° F. or $C_6$ to 250° F. fraction of naphtha containing not more than innocuous concentrations of sulfur, nitrogen, and arsenic is charged to the low pressure reforming unit while a 250° F. to 380° F. fraction of the same or different naphtha or naphthas likewise containing not more than innocuous concentrations of sulfur, nitrogen, and arsenic is charged to the high pressure reforming unit. Accordingly, FIGURE 3 provides a schematic drawing illustrating the flow of gases and liquids when the naphtha is pretreated to reduce the concentration of sulfur and/or nitrogen and/or arsenic to innocuous levels and (1) reforming the $C_5$ to 380° F. or $C_6$ to 380° F. fraction in both the low pressure and the high pressure reforming units (A) with cascading of all of the high pressure reformer make-gas to the pretreater, and (B) with cascading of a portion of the high pressure reformer make-gas to the pretreater, cascading the balance of the high pressure reformer make-gas to the low pressure reforming unit; and (2) reforming the $C_5$ to 250° F. or $C_6$ to 250° F. fraction in the low pressure reforming unit and the 250° to 380° F. fraction in the high pressure reforming unit with distribution of the high pressure reformer gases as set forth in 1A and 1B supra. The flow of gases and liquids in accordance with embodiment 1A will be described. Thereafter, the flow of gases and liquids in accordance with embodiment 1B will be described. Thus, for example, a $C_6$ to 380° F. fraction of naphtha as defined hereinbefore containing at least one of sulfur, nitrogen, and arsenic in concentration greater than the aforesaid innocuous concentrations is drawn from a source not shown through pipe 1 by pump 2 and discharged into pipe 3 at a pressure in excess of that in pretreater 7.

Pretreater 7 is operated under conditions dependent upon the nitrogen content of the depentanized charge naphtha. That is to say, when a hydrogenating catalyst having hydrodesulfurizing and hydrodenitrogenizing capabilities such as those of the presently available catalyst comprising a mixture of oxides of cobalt and molybdenum on a support of alumina is employed, naphtha containing not more than about 10 p.p.m. of nitrogen can be treated at 500 p.s.i.g., 600° to 750° F., liquid hourly space velocities of 2 to 5, and a hydrogen circulation of 300 to 1000 s.c.f. (standard cubic feet) per barrel of naphtha to produce a pretreated naphtha or reformer feed containing not more than innocuous concentrations of sulfur, nitrogen, and arsenic. On the other hand, the same catalysts can be used to reduce the nitrogen content of naphtha from concentrations in excess of 25 p.p.m. to 1 p.p.m. either by employing a pressure in excess of 500 p.s.i.g., e.g., 800 p.s.i.g. and substantially the same reactor temperatures, hydrogen circulation and liquid hourly space velocities or the reactor pressure can be 500 p.s.i.g., the temperature 600° to 750° F., the liquid hourly space velocity not more than 2 and the hydrogen circulation about 500 to 1000 s.c.f. per barrel. Pretreater 7 can be provided with an upper bed of the aforesaid "cobalt-moly"

catalyst and a lower bed of platinum-group metal hydrogenating catalyst and the naphtha pretreated at pressures of about 500 p.s.i.g., temperatures of about 600° to 750° F., liquid hourly spaced velocities of 2 to 5, and hydrogen circulation of 300 to 1000 s.c.f. per barrel to reduce the concentration of nitrogen from 13 p.p.m. to not more than 1 p.p.m. as described in the co-pending application for U.S. Letters Patent Serial No. 816,412, filed May 28, 1959, in the name of Louis P. Evans. The well-known mixture of sulfides of nickel and tungsten is also useful for converting organic nitrogen compounds to volatile derivatives of nitrogen and hydrogen. In general, when the concentration of nitrogen is reduced to not more than 1 p.p.m. the concentrations of sulfur and arsenic are not in excess of the aforesaid innocuous concentrations of these contaminants.

The charge naphtha flows from pump 2 through pipe 3 to coil 4 in heater 5. In heater 5 the charge naphtha is heated to the temperature required by the catalyst and other factors to reduce the concentration of contaminants to the aforesaid innocuous levels. The heated charge naphtha ($C_6$–380° F.) flows from heater 5 through conduit 6 to pretreater 7. Since all of the high pressure reformer make-gas, i.e., high pressure excess gas, is to be admixed with the charge to the pretreater the required amount of hydrogen-containing high pressure excess or make-gas flows from liquid-gas separator 121 through conduits 122 and 129 to a point in conduit 6 in intermediate to heater 5 and to pretreater 7 (valve 128 open).

The mixture of high pressure make-gas and the illustrative $C_6$ to 380° F. naphtha flows through conduit 6 to pretreater 7. The mixture of charge naphtha ($C_6$ to 380° F.) and high pressure reformer make-gas flows downwardly through pretreater 7 in contact with particle-form solid hydrogenating catalyst having hydrodesulfurizing and hydrodenitrogenizing capabilities and the capability of removing arsenic to the outlet of pretreater 7 and conduit 8.

The pretreater effluent flows through conduit 8 to cooler 9. In cooler 9 the pretreater effluent is cooled to a temperature at which $C_4$ and heavier hydrocarbons are condensed. The condensed and gaseous pretreater effluent flows from cooler 9 through conduit 10 to liquid-gas separator 11.

In separator 11 the uncondensed pretreater effluent is separated from the condensed pretreater effluent designated $C_6$ to 380° F. reformer feed. The uncondensed pretreater effluent flows from separator 11 through conduit 12 to means 13 for removing ammonia and hydrogen sulfide. (Means for the removal of ammonia and hydrogen sulfide are well known to those skilled in the art and are not per se a part of the present invention.) With valve 75 in conduit 76 closed, the uncondensed pretreater effluent flows from means to remove ammonia and hydrogen sulfide 13 through conduit 16. Dependent upon the partial pressure of water in the uncondensed pretreater effluent, designated scrubbed pretreater off-gas or low pressure hydrogen, the moisture content of the $C_6$–380° F. reformer feed, and the partial pressure of water which can be tolerated in the low pressure reactors $L_1$ to $L_6$ the low pressure hydrogen, comprising hydrogen and $C_1$ to $C_3$ hydrocarbons, either flows to drier 17 (valve 19 in conduit 20 closed, valve 77 open) or flows through conduit 20 (valve 77 closed, valve 19 open) to conduit 18. The pressure in conduit 18 usually is of the order of 400 p.s.i.g. when the pretreater 7 is under about 500 p.s.i.g. Therefore, the pressure in conduit 26 being less than 400 p.s.i.g. no compressor is required to admix the low pressure hydrogen with the $C_6$–380° F. reformer feed in conduit 26 when the low pressure reforming unit is operated with the addition of hydrogen, such as the aforesaid low pressure hydrogen. Those skilled in the art will recognize that when no extraneous hydrogen is used in the low pressure reforming unit the aforesaid uncondensed pretreater effluent can be diverted through conduit 76 under control of valve 75 to other processes or to the refinery fuel main (valves 19 and 77 closed), or with valve 80 closed diverted through conduit 81 under control of valve 79 to the refinery fuel main.

Returning to liquid-gas separator 11 the flow of the condensed pretreater effluent will be described. The condensed pretreater effluent comprising $C_4$ and heavier hydrocarbons in accordance with embodiment 1 supra flows from separator 11 through pipe 22 (valve 82 closed; valve 24 open) to the suction side of pump 25.

At a point intermediate to pump 25 and to valve 24 a portion of the condensed pretreater effluent, i.e., $C_6$–380° F. reformer feed is diverted through pipe 100 under control of valve 101 as feed to the high pressure reforming unit. However, the flow of the $C_6$–380° F. reformer feed through the low pressure reforming unit will be described first.

The $C_6$–380° F. reformer feed other than that which is diverted through pipe 100, i.e., a portion of the pretreater effluent condensate, flows through pipe 22 to pump 25. Pump 25 discharges the low pressure feed portion of the $C_6$–380° F. reformer feed into conduit 26 at a pressure greater than that in the first reactor of the low pressure reforming unit but not greater than the pressure in conduit 18. That is to say, the pressure in reactor 32 or reactor 61 (whichever is on-stream) is about zero to about 400 p.s.i.g. Therefore, the pressure in conduit 26 is greater by the pressure drop between pump 25 and reactor 32 or reactor 61. When the pressure in reactor 32 or reactor 61 is less than that in conduit 22 by an amount substantially greater than the pressure drop therebetween pump 25 can be by-passed.

Sufficient low pressure hydrogen flows from conduit 18 into conduit 26 at a point intermediate to pump 25 and to coil 27 in heater 28 to maintain 0.25 to 3.5 mols of once-through hydrogen per mol of low pressure feed. The low pressure feed portion of the $C_6$–380° F. reformer feed, designated low pressure feed, with or without added extraneous hydrogen or hydrogen-containing gases (valve 15 closed) flows through conduit 26 to coil 27 in heater 28. In coil 27 the low pressure feed is heated to a reforming temperature within the range of about 800° to about 1000° F. dependent upon the activity of the catalyst, the liquid hourly space velocity, and the required or target octane rating (research+3 cc. TEL) of the $C_5$ and heavier reformate ($C_5$+ reformate) in the effluent of the low pressure reforming unit.

The low pressure reforming unit includes a plurality of reactors, usually adiabatic, some of which are on-stream and one or more of which usually are off-stream in which the catalyst is being regenerated. In FIGURE 3, the low pressure reforming unit is illustrated as including three pairs of reactors, one of each pair of reactors being on-stream and one of each pair of reactors being off-stream. Thus, reactors $L_1$, $L_4$, and $L_6$ can be on-stream while reactors $L_2$, $L_3$, and $L_5$ are off-stream. Other combinations of reactors on-stream and off-stream can be used dependent upon local conditions and the activity of the catalyst in each reactor. Nevertheless, the flow of low pressure feed and reaction products is successive through the reactors on-stream. Accordingly, for illustrative purposes it can be assumed that reactors $L_1$, $L_4$, and $L_6$ are on-stream. (It will be noted that piping for the regeneration of the catalyst in each reactor has been omitted for simplicity of description and as well within the capabilities of one skilled in the art.)

The heated low pressure feed flows from coil 27 in heater 28 through conduits 29 and 30 to reactor 32 (valve 60 closed; valve 31 open). The heated low pressure feed enters reactor 32 at vapor inlet temperature within the range of 800° to 1000° F. dependent upon the activity of the catalyst and the other variables enumerated hereinbefore. The low pressure feed flows downwardly through reactor 32 in contact with particle-form solid reforming catalyst to conduit 33 and thence to coil 35 in heater 36 (valve 34 open; valve 63 closed). Since the reaction in reactor 32 is primarily endothermic and reactor 32 being an adiabatic reactor, the temperature of the effluent from reactor 32, i.e., the first low pressure effluent usually is below the required temperature at the vapor inlet of the second reactor (66). Accordingly, the first low pressure effluent is reheated to reforming temperature in heater 36. From heater 36 the reheated first low pressure effluent flows through conduit 64 (valve 65 open; valve 38 closed) to reactor 66. The vapor inlet temperature at reactor 66, i.e., the temperature at which the reheated first low pressure effluent enters reactor 66, is a reforming temperature and is the same as, lower than, or higher than the vapor inlet temperature at reactor 32. The reheated first low pressure effluent flows downwardly in contact with particle-form reforming catalyst in reactor 66 to conduit 67. The effluent of reactor 66, i.e., second low pressure effluent, flows through conduit 67 (valve 68 open; valve 41 closed) to conduit 69 and coil 42 in heater 43. In heater 43 the second low pressure effluent is reheated to a reforming temperature. The reheated second effluent flows from heater 43 through conduits 44 and 70 (valve 45 closed; valve 71 open) to reactor 72. The reheated second low pressure effluent enters reactor 72 at a vapor inlet temperature the same as, lower than, or higher than the vapor inlet temperatures of reactors 32 and 66.

The reheated second low pressure effluent flows downwardly in contact with particle-form solid reforming catalyst in reactor 72 to conduit 73. The effluent of reactor 72, i.e., final low pressure effluent flows through conduit 73 (valve 74 open; valve 48 closed) to conduit 78 and thence to cooler 49. In cooler 49 the final effluent is cooled to a temperature at which $C_4$ and heavier hydrocarbons are condensed. The cooled final effluent flows from cooler 49 through conduit 50 to low pressure liquid-gas separator 51. In separator 51 the low pressure reformer gas comprising hydrogen and $C_1$ to $C_3$ hydrocarbons is separated from the condensed $C_4$ and heavier hydrocarbons.

The $C_4$ and heavier hydrocarbons, i.e., the final low pressure condensate, flow from separator 51 through pipe 52 to a stabilizer not shown in which $C_4$ and lighter hydrocarbons are separated from $C_5+$ reformate having the target octane rating.

The low pressure reforming gas flows from separator 51 through conduit 53. Since in this embodiment all of the high pressure reformer make-gas is cascaded to the pretreater described hereinafter, the low pressure reformer gas flows through conduit 53 to other hydroprocesses or refinery fuel main.

In the embodiment of the present invention being described a portion of the $C_6$–380° F. reformer feed flowing through pipe 22 is diverted through pipe 100 under control of valve 101 to the high pressure reforming unit.

Thus, for illustrative purposes pretreater 7 can treat 400 barrels of Middle-East straight run $C_6$–380° F. naphtha per hour to produce 400 barrels of $C_6$–380° F. reformer feed as the condensate in separator 11. The pretreater pressure is 425 p.s.i.g. The hydrogen circulation is 300 s.c.f. (standard cubic feet) of hydrogen per barrel. The consumption of hydrogen in pretreater 7 is fifty standard cubic feet per barrel of feed. The hydrogen-to-naphtha mol ratio in the low pressure reforming unit is 0.25 mols of hydrogen per mol of $C_6$–380° F. reformer feed. A barrel of Middle-East naphtha is 2.1 mols. The high pressure reforming unit produces $C_5+$ reformate having an octane rating of 95. Accordingly, from Table II supra 400 s.c.f. of hydrogen is produced in the high pressure reforming unit per barrel of $C_6$–380° F. reformer feed charged thereto. The aforesaid 400 barrels of $C_6$–380° F. naphtha require a circulation of 120,000 s.c.f. of hydrogen per hour. From this it follows that 300 barrels per hour of the $C_6$–380° F. reformer feed flowing from separator 11 through conduit 22 is diverted through conduit 100 to the high pressure reforming unit to provide the hydrogen circulation required in the pretreater. When the ratio of hydrogen-to-$C_6$–380° F. reformer feed in the low pressure reforming unit is 2 mols of hydrogen per mol of reformer feed, all of the high pressure reformer make-gas is cascaded to pretreater 7, and the $C_5+$ reformate from the high pressure reforming unit has an octane rating of 95, about 76 percent of the pretreater hydrogen flowing from ammonia and hydrogen sulfide removal means 13 flows, as described hereinbefore, through conduit 18 to conduit 26 for use in the low pressure reforming unit.

In other words, the amount of $C_6$–380° F. reformer feed diverted from pipe 22 through pipe 100 is dependent upon the capacity of each of the reforming units, i.e., upon the liquid hourly space velocity selected for the high pressure reforming unit, the hydrogen produced in the high pressure unit at the required octane rating of the high pressure $C_5+$ reformate, the amount of hydrogen circulation required in the pretreater, the amount of hydrogen consumed in the pretreater, and the amount of extraneous hydrogen introduced into the low pressure reforming unit.

The $C_6$–380° F. reformer feed diverted to pipe 100 under control of valve 101 flows to the suction side of pump 102. Pump 102 discharges the diverted $C_6$–380° F. reformer feed, designated high pressure $C_6$–380° F. feed, into conduit 103 at a pressure in excess of that in reactor 107. Hydrogen, or hydrogen-containing gases, usually reformer recycle gas (after start-up) flowing in conduit 126 at a pressure at least equal to that in conduit 103 is mixed with the high pressure $C_6$–380° F. reformer feed in conduit 103 in a mol ratio within the limits set forth hereinbefore to form a high pressure charge mixture. The charge mixture flows through conduit 103 to coil 104 in heater 105. In heater 105 the charge mixture is heated to a reforming temperature. The heated charge mixture flows from heater 105 through conduit 106 to enter reactor 107 at a vapor inlet temperature within the range of about 800° to 1000° F. dependent upon the required octane of the $C_5+$ reformate, the activity of the catalyst, and the liquid hourly space velocity.

The charge mixture flows downwardly in contact with particle-form solid reforming catalyst in reactor 107 to conduit 108. The effluent from reactor 107, i.e., first high pressure effluent, flows through conduit 108 to coil 109 in heater 110. The first high pressure effluent is heated in heater 110 to a reforming temperature. The reheated first high pressure effluent flows from heater 110 through conduit 111 to enter reactor 112 at a vapor inlet temperature the same as, lower than, or higher than the vapor inlet temperature at reactor 107.

The reheated first high pressure effluent flows downwardly in contact with particle-form solid reforming catalyst in reactor 112 to conduit 113. The effluent of reactor 112, i.e., the second high pressure effluent, flows through conduit 113 to coil 114 in heater 115. In heater 115 the second high pressure effluent is heated to a reforming temperature. The reheated second high pressure effluent flows from heater 115 through conduit 116 to enter reactor 117 at a vapor inlet temperature the same as, lower than, or higher than the vapor inlet temperatures at reactors 107 and 112. The reheated second high pressure effluent flows downwardly in contact with particle-form solid reforming catalyst in reactor 117 to conduit 118.

The effluent of reactor 117, i.e., final high pressure effluent flows through conduit 118 to cooler 119. In cooler 119 the final high pressure effluent is cooled to a temperature at which $C_4$ and heavier hydrocarbons condense. The cooled final high pressure effluent flows from cooler 119 through conduit 120 to liquid-gas separator 121. In separator 121 the reformer gas comprising hydrogen and $C_1$ to $C_3$ hydrocarbons separates from the condensed $C_4$ and heavier hydrocarbons, i.e., final condensate. The final high pressure condensate flows from separator 121 through pipe 123 to stabilizing means, etc. The reformer gas flows from separator 121 through conduit 122 to conduit 124 and compressor 125. A portion of the aforesaid reformer gas equivalent to the gas made in the high pressure reactors 107, 112, and 117, i.e., the high pressure make-gas, is diverted through conduit 129 under control of valve 128 to conduit 6 and pretreater 7. The balance of the aforesaid reformer gas, i.e., the high pressure recycle gas, flows to the suction side of compressor 125 through conduit 124 as stated hereinbefore. Compressor 125 recompresses the reformer gas to a pressure greater than that in conduit 103. The recompressed reformer gas, i.e., hydrogen-containing high pressure recycle gas, flows through conduit 126 to conduit 103 to mix with the high pressure $C_6$–380° F. reformer feed to form the high pressure charge mixture as described hereinbefore.

It is believed unnecessary to do more than describe the changes in flow of gas in embodiment 1B of the present invention. Thus, while in embodiment 1A described hereinbefore all of the gas made in the high pressure reforming unit, i.e., all of the high pressure make-gas, flows through conduits 122 and 129 to conduit 6 and pretreater 7 and hydrogen-containing gas to maintain a hydrogen-to-low pressure $C_6$–380° F. reformer feed mol ratio up to 3.5:1 is supplied by the purified or scrubbed pretreater off-gas flowing through conduit 18 to conduit 26, in embodiment 1B a portion of the high pressure make-gas flows from conduit 129 through conduit 14 under control of valve 15 to conduit 26 (valves 19 and 77 closed; valve 75 open) to mix with the low pressure $C_6$–380° F. reformer feed to provide a charge mixture in which the mol ratio of hydrogen-to-low pressure $C_6$–380° F. reformer feed is not more than 3.5 while the balance of the high pressure make-gas flows to pretreater 7. A few examples of $C_6$–380° F. reformer feed and the flow of hydrogen-containing gas illustrative of embodiments 1A and 1B are provided in Table IV.

the same as the use made thereof in the corresponding modification described hereinbefore as will be manifest to those skilled in the art from the following description.) For example, a $C_6$ to 380° F. fraction of naphtha containing in excess of an innocuous concentration of at least one contaminant selected from the group consisting of sulfur, nitrogen, and arsenic is drawn from a source not shown through pipe 1 by pump 2. The $C_6$–380° F. charge naphtha is discharged into pipe 3 by pump 2 at a pressure greater than that in pretreater 7. (As discussed hereinbefore, the reaction conditions in pretreater 7 are dependent primarily upon the nitrogen content of the $C_6$–380° F. charge naphtha and are selected to reduce the nitrogen content to provide $C_6$–380° F. reformer feed containing not more than 1 p.p.m. (part per million) of nitrogen.) Accordingly, the pressure in pretreater 7 will be within the range of about 400 to 500 p.s.i.g. for the treatment of charge naphtha containing up to about 15 p.p.m. of nitrogen and of about 800 to 2000 p.s.i.g. for the treatment of charge naphthas containing up to about 80 p.p.m. of nitrogen depending upon the hydrodenitrogenizing capability of the catalyst employed as described hereinbefore.

The $C_6$–380° F. charge naphtha designated charge naphtha, flows through pipe 3 to coil 4 in heater 5. In heater 5 the charge naphtha is heated to a hydro-decontaminating temperature within the range of about 600° to about 800° F. The heated charge naphtha flows from heater 5 through conduit 6 to pretreater 7. At a point in conduit 6 intermediate to heater 5 and pretreater 7 hydrogen, and after start-up preferably hydrogen-containing high pressure reformer gas, i.e., high pressure make-gas, is admixed with the charge naphtha in amount to provide a circulation of about 300 to about 500 s.c.f. of hydrogen per barrel of charge naphtha. In the present illustrative example (an example of embodiment 2B) the hydrogen-containing gas made in the high pressure reforming unit, i.e., the high pressure make-gas, is available in such vol-

*Table IV*

EMBODIMENT 1A

| Barrels of $C_6$–380° F. Per Hour to Pretreater | S.c.f. $H_2$ Consumed Per Hour in Pretreater | Barrels $C_6$–380° F High Pressure Reformer Feed Per Hour | O. N. (R+3cc.) $C_5$+ Reformate From High Pressure | S.c.f Hydrogen Made Per Hour in H. P. Unit | S.c.f. Hydrogen to Conduit 6 Per Hour | Barrels $C_6$–380° F. Low Pressure Reformer Feed Per Hour | S.c.f. Purified Pretreater Hydrogen to Conduit 18 | $H_2$ to $C_6$–380° F L. P. Ref. Feed Mol Ratio |
|---|---|---|---|---|---|---|---|---|
| 400 [1] | 20,000 | 300 | 100 | 132,000 | 132,000 | 100 | 86,000 | 1 |
| 400 [2] | 20,000 | 250 | 100 | 198,000 | 198,000 | 150 | 129,000 | 1 |
| 400 [3] | 20,000 | 300 | 105 | 330,000 | 330,000 | 100 | 300,000 | 3.5 |

EMBODIMENT 1B

| Bbls. of $C_6$ to 380° F Per Hr. to Pretreater | S.c.f. $H_2$ Consumed Per Hour in Pretreater | Bbls. $C_6$–380° F H. P. Reformer Feed Per Hour | O. N. (R+3cc.) $C_5$+ Ref. H. P. | S.c.f. $H_2$ Made Per Hour in H. P. Unit | S.c.f. Hydrogen to Conduit 6 Per Hour | S.c.f. Hydrogen to Conduit 14 Per Hour | $H_2$ to $C_6$–380° F L. P. Ref. Feed Mol Ratio |
|---|---|---|---|---|---|---|---|
| 400 [2] | 20,000 | 300 | 100 | 237,000 | 131,000 | 86,000 | 1 |
| 400 [3] | 20,000 | 200 | 105 | 220,000 | 120,000 | 100,000 | 0.58 |

[1] Mid-East. [2] Mid-Continent. [3] California (Wilmington).

Embodiments 2A and 2B are illustrative of the present invention and differ primarily in providing for treating $C_6$–250° F. fraction of one or more naphthas in the low pressure reforming unit while treating the 250° to 380° fraction of one or more naphthas in the high pressure reforming unit. The 250° F. and 380° F. cut points are nominal when the ratio of low pressure to high pressure feed is determined as described hereinbefore. This determines the amount of this stream and bottoms from fractionator 134. The boiling ranges of the low pressure and high pressure feeds will vary dependent upon local conditions. (The use of the gas made in the high pressure reforming unit, i.e., the high pressure make-gas, being ume that a portion thereof cascades from the high pressure reforming unit to the pretreater (pretreater pressure about 425 p.s.i.g. maximum) and the balance of the hydrogen-containing gas made in the high pressure reforming unit cascades to the low pressure reforming unit. (Those skilled in the art will recognize that when the pressure in pretreater 7 is greater than the pressure in conduit 122 less pressure drop to conduit 6, the hydrogen-containing high pressure reformer make-gas flowing in conduit 129 is recompressed to at least the pressure in conduit 6 by a compressor not shown.) In other words, when the sum of the volume of extraneous hydrogen required to provide up to 3.5 mols of hydrogen per mol of reformer feed introduced into the low pressure reforming unit plus the volume of hydrogen required in the pretreater does not exceed the volume of hydrogen-containing gas made in the high pressure reforming unit, i.e., high pressure make-gas, it is not necessary to purify the pretreater off-gas to supply extraneous hydrogen to the low pressure reforming unit. Thus, in the present illustrative description of embodiment 2B a portion of the hydrogen-containing high pressure reformer gas flows from conduit 122 through conduit 129 under control of valve 128 to conduit 6 to provide the volume of hydrogen-containing gas required in pretreater 7 as set forth hereinafter in Table V. The balance of the H.P. make-gas flows from conduit 129 through conduit 14 under control of valve 15 to conduit 26 to provide up to 3.5 mols of hydrogen per mol of $C_6$ to 250° F. reformer feed.

The mixture of $C_6$–380° F. charge naptha and H.P. make-gas in conduit 6 is the pretreater charge mixture. The pretreater charge mixture flows through conduit 6 to enter pretreater 7 at a hydro-contaminating temperature within the range of about 600° to about 800° F. The pretreater charge mixture flows downwardly through pretreater 7 in contact with hydrogenating catalyst having hydrodesulfurizing and hydrodenitrogenizing capabilities such as a mixture of oxides and/or sulfides of cobalt and molybdenum on an alumina support, a mixture of sulfides of nickel and tungsten with or without a support, and the multiple beds comprising a first bed of a mixture of oxides or sulfides of cobalt and molybdenum and a second bed of platinum on alumina. From pretreater 7 the reacted pretreated charge mixture flows through conduit 8 to cooler 9. In cooler 9 the pretreater effluent is cooled to a temperature at which $C_4$ and heavier hydrocarbons are condensed. The cooled pretreater effluent flows from cooler 9 through conduit 10 to pretreater liquid-gas separator 11. In separator 11 the uncondensed pretreater effluent comprising hydrogen, hydrogen derivatives or sulfur and/or nitrogen, i.e., ammonia and hydrogen sulfide, and $C_1$ to $C_3$ hydrocarbons, designated pretreater off-gas, separates from the condensed pretreater effluent, designated pretreater condensate. The pretreater off-gas flows from separator 11 through conduits 12 and 81 (valve 79 open; valve 80 closed) to other processes or to refinery fuel.

The condensed pretreater effluent, i.e., pretreater condensate, flows from separator 11 through conduits 22 and 23 and thence to coil 131 in heater 132 (valve 24 closed; valve 82 open). In heater 132 the pretreater effluent is heated to a temperature at which hydrocarbons boiling up to 250° F. are volatilized. The heated pretreated condensate flows from the heater 132 through pipe 133 to fractionator 134.

In fractionator 134 residual hydrogen, residual hydrogen sulfide and/or residual ammonia together with $C_1$ to $C_4$ hydrocarbons are taken overhead through conduit 135 to cooler 136. In cooler 136 the overhead is cooled to a temperature at which $C_4$ and heavier hydrocarbons are condensed. From cooler 136 the cooled overhead flows through conduit 137 to accumulator 138.

From accumulator 138 the uncondensed hydrogen, hydrogen sulfide and/or ammonia and $C_1$ to $C_3$ hydrocarbons of the fractionator overhead flow through conduit 144 to conduit 81 (valve 147 open; valve 149 closed) and thence with the balance of the pretreater off-gas flows as described hereinbefore. Alternatively, the uncondensed hydrogen, hydrogen sulfide and/or ammonia, and $C_1$ to $C_3$ hydrocarbons of the fractionator overhead flow through conduits 144 and 148 (valve 149 open; valve 147 closed) to conduit 12 to admix with the separator off-gas and flow to ammonia and hydrogen sulfide removal means 13.

The condensed $C_4$ and heavier hydrocarbons flow from accumulator 138 through pipe 139 to the suction side of pump 140 and thence through pipe 141 for use in fractionator 134 as reflux. The condensate in excess of that required for reflux flows through pipe 142 under control of valve 143 to recovery and/or separation of normal $C_4$ and $C_5$ hydrocarbons from the branch chained $C_4$ and $C_5$ hydrocarbons.

A side stream, comprising $C_6$ and hydrocarbons boiling up to 250° F., i.e., hydrocarbons having normal boiling points within the range of 176° to 250° F., dependent upon local conditions as stated hereinbefore, is taken from fractionator 134 through pipe 145. The side stream comprises the feed to the low pressure reforming unit and flows through pipes 145 and 22 to the suction side of pump 25 (valve 146 open).

The low pressure reforming feed, i.e., hydrocarbons having normal boiling points, for example, within the range of 176° to about 250° F. is discharged by pump 25 into conduit 26 at a pressure greater than the pressure in reactor $L_2$. (The following description of the flow of low pressure reformer feed, designated L.P. feed, assumes that reactors $L_2$, $L_3$, and $L_5$ are on-stream and that the catalyst in reactors $L_1$, $L_4$, and $L_6$ is being regenerated.) Since the pretreater off-gas is presumed not to be used in this illustrative example, the extraneous hydrogen necessary to maintain hydrogen-to-L.P. feed mol ratios of 0.25 to 3.5 flows from conduit 129 (valves 77 and 19 are closed and valve 15 is open). Therefore, an amount of H.P. make-gas less the volume of H.P. make-gas flowing through conduit 129 to conduit 6 and sufficient to maintain a hydrogen-to-L.P. feed mol ratio up to 3.5 mols of hydrogen per mol of L.P. feed flows from conduit 129 through conduit 14 under control of valve 15 to conduit 26 where it is mixed with the L.P. feed to provide an L.P. feed mixture. The L.P. feed mixture, containing hydrogen extraneous to the low pressure reforming unit up to 3.5 mols of hydrogen per mol of L.P. feed, flows through conduit 26 to coil 27 in heater 28. In heater 28 the L.P. feed mixture is heated to a temperature to provide a vapor inlet reforming temperature at reactor 61 ($L_2$) within the range of about 800° to about 1000° F. dependent upon the required or target octane rating of the $C_5+$ reformate in the effluent from reactor 46, the activity of the catalyst, and the liquid hourly space velocity. The heated L.P. feed mixture flows from heater 28 through conduits 29 and 59 (valve 31 closed; valve 60 open) to low pressure reformer 61. In low pressure reformer 61 the L.P. feed mixture flows downwardly in contact with particle-form solid reforming catalyst. The reforming catalyst presently preferred is a platinum-group metal reforming catalyst especially one comprising about 0.35 to about 0.6 percent by weight of platinum on a refractory oxide support such as alumina. From reactor 61 the L.P. feed mixture flows through conduits 62 and 33 to coil 35 in heater 36 (valve 63 open; valve 34 closed). In heater 36 the effluent of reactor 61, designated first L.P. effluent, is reheated to reforming temperature within the range of 800° to 1000° F. to provide a vapor inlet temperature at reactor 39 the same as, lower than, or higher than, the vapor inlet temperature at reactor 61.

The reheated first L.P. effluent flows from heater 36 through conduit 37 (valve 38 open; valve 65 closed) to reactor 39. The reheated first L.P. effluent flows downwardly through reactor 39 in contact with particle-form solid reforming catalyst the same as or different from that in reactor 61 and presently preferred the same as in reactor 61. From reactor 39 the effluent thereof, designated second L.P. effluent, flows through conduits 40 and 69 to coil 42 in heater 43 (valve 41 open; valve 68 closed).

In heater 43 the second L.P. effluent is reheated to a reforming temperature within the range of 800° to 1000° F. to provide a vapor inlet temperature at reactor 46 the same as, lower than, or higher than the vapor inlet temperatures at reactors 61 and 39. The reheated second L.P. effluent flows from heater 43 through conduit 44 to reactor 46 (valve 45 open; valve 71 closed). The reheated second L.P. effluent flows downwardly in reactor 46 in contact with particle-form solid reforming catalyst. Presently, it is preferred to use a catalyst of same composition in reformer 46 as is used in reformers 61 and 39. The effluent of reactor 46, designated final effluent, flows from reactor 46 through conduits 47 and 78 to cooler 49 (valve 48 open; valve 74 closed).

In cooler 49 the final L.P. effluent is cooled to a temperature at which $C_4$ and heavier hydrocarbons are condensed. The cooled final L.P. effluent flows from cooler 49 through conduit 50 to low pressure liquid-gas separator 51. In separator 51 the uncondensed final L.P. effluent, designated L.P. effluent gas, flows from separator 51 through conduit 53 to other hydro-processes or the refinery fuel main. The condensed final L.P. effluent, i.e., L.P. condensate, flows from separator 51 through pipe 52 to a stabilizer (not shown) for separation of $C_4$ and lighter hydrocarbons to provide low pressure $C_5+$ reformate having the required or target octane rating. The low pressure $C_5+$ reformate then flows to disposition depending upon local conditions such as admixture with additives such as alkyl lead, anti-icer, to blending, to storage, to distribution.

The bottoms of fractionator 134 is reformed in the high pressure reforming unit. That is to say, the bottoms of fractionator 134, comprising hydrocarbons having normal boiling points, for example, within the range of about 250° F. to 380° F., flows through pipe 127 (valve 130 open; valve 101 closed) to pipe 100 and the suction side of pump 102.

Pump 102 discharges the bottoms, designated H.P. feed, into conduit 103 at a pressure greater than the pressure in reactor 107. The H.P. feed flows through conduit 103 to coil 104 in heater 105. At a point in conduit 103 intermediate to pump 102 and to coil 104 high pressure reformer recycle gas (H.P. recycle gas) flowing from compressor 125 through conduit 126 at a pressure at least equal to that in conduit 103 is admixed with the H.P. feed to provide a H.P. charge mixture in which the mol ratio of hydrogen-to-H.P. feed is within the range of 1 to 20, preferably 6 to 10. The H.P. charge mixture flows through conduit 103 to coil 104 in heater 105. In heater 105 the H.P. charge mixture is heated to a temperature to provide a vapor inlet reforming temperature at reactor 107 within the range of about 800° to about 1000° F. The heated H.P. charge mixture flows from heater 105 through conduit 106 to reactor 107.

The heated H.P. charge mixture flows downwardly through reactor 107 in contact with particle-form solid reforming catalyst, at present preferably platinum-group metal reforming catalyst, especially reforming catalyst comprising 0.35 to 0.6 percent by weight platinum on alumina, to conduit 108. The effluent of reactor 107, designated first H.P. effluent, flows through conduit 108 to coil 109 in heater 110. In heater 110 the first H.P. effluent is heated to a reforming temperature to provide a vapor inlet temperature at reactor 112 within the range of 800° to 1000° F. the same as, lower than, or higher than the vapor inlet temperature at reactor 107. The heated first H.P. effluent flows from heater 110 through conduit 111 to reactor 112.

In reactor 112 the heated first H.P. effluent flows downwardly in contact with particle-form solid reforming catalyst, at present preferably having substantially the same composition as that in reactor 107. The effluent of reactor 112, designated second H.P. effluent, flows through conduit 113 to coil 114 in heater 115. In heater 115 the second H.P. effluent is heated to a temperature to provide a vapor inlet temperature at reactor 117 which is a reforming temperature within the range of 800° to 1000° F. the same as, lower than, or higher than the vapor inlet temperatures at reactors 107 and 112.

The heated second H.P. effluent flows from heater 115 through conduit 116 to reactor 117. In reactor 117 the heated second H.P. effluent flows downwardly in contact with particle-form solid reforming catalyst. Presently, it is preferred to charge reactor 117 with catalyst having substantially the same composition as that in reactors 107 and 112. The effluent of reactor 117, designated final H.P. effluent, comprising hydrogen and $C_1$ and heavier hydrocarbons, flows through conduit 118 to cooler 119. In cooler 119 the final H.P. effluent is cooled to a temperature at which $C_4$ and heavier hydrocarbons are condensed. The cooled final H.P. effluent flows from cooler 119 through conduit 120 to high pressure liquid-gas separator 121. In separator 121 the uncondensed final H.P. effluent, designated H.P. reformer gas, comprising hydrogen and $C_1$ to $C_3$ hydrocarbons, separates from the condensed final H.P. effluent, designated H.P. condensate comprising $C_4$ and heavier hydrocarbons.

The H.P. reformer gas comprising hydrogen-containing H.P. recycle gas and hydrogen-containing make-gas flows from separator 121 through conduit 122. The high pressure make-gas flows from conduit 122 to conduit 129. A portion of the high pressure make-gas cascades to the low pressure reforming unit while the balance flows to the pretreater both as described hereinbefore.

The H.P. condensate flows from separator 121 through pipe 123 to stabilizing means for separating and recovering of $C_4$ and lighter hydrocarbons to provide high pressure $C_5+$ reformate of the required or target octane rating.

Illustrative of the amount of hydrogen produced in the high pressure reforming unit and the distribution thereof to the pretreater and low-pressure reforming unit are the examples presented in Table V.

Table V

EMBODIMENT 2A

| Bbls. of $C_6$-380° F. Naphtha to Pretreater | S.c.f. $H_2$ Consumed Per Hour in Pretreater | Bbls. of* 250° to 380° F. H.P. Ref. Feed | O.N. (R+3 cc.) $C_5+$ Reformate from High Press. | S.c.f. $H_2$ Made Per Hr. in H.P. Unit | S.c.f. $H_2$ to Conduit 6 per Hour | Bbls. $C_6$-250° F. L.P.* Reformer Feed | S.c.f. Purified $H_2$ Conduit 18 | $H_2$ to $C_6$-250° F. L.P. Feed Mol Ratio |
|---|---|---|---|---|---|---|---|---|
| 400 [1] | 20,000 | 255 | 105 | 170,000 | 170,000 | 145 | 1 | 145,000 |
| 400 [2] | 20,000 | 240 | 100 | 195,000 | 195,000 | 160 | 1 | 160,000 |
| 400 [3] | 20,000 | 200 | 100 | 214,000 | 214,000 | 200 | 1.94 | 194,000 |

EMBODIMENT 2B

| Bbls. of $C_6$-380° F. Naphtha to Pretreater | S.c.f. $H_2$ Consumed Per Hour in Pretreater | Bbls. of 250° to 380° F. H.P. Feed | O.N. (R+3 cc.) $C_5+$ Reformate from High Press. | S.c.f. $H_2$ Made per Hr. in H.P. Unit | S.c.f. $H_2$ to Conduit 6 per Hour | Bbls. $C_6$-250° F. L.P. Reformer Feed | $H_2$ to $C_6$ to 250° F. L.P. Feed Mol Ratio |
|---|---|---|---|---|---|---|---|
| 400 [2] | 20,000 | 250 | 100 | 202,000 | 120,000 | 150 | 0.54 |
| 400 [3] | 20,000 | 250 | 100 | 267,000 | 120,000 | 150 | 1.17 |

[1] Mid-East.  [2] Mid-Continent.  [3] California (Wilmington).

*Boiling range of these fractions will have to be adjusted to give desired ratio of HP and LP unit charge as described hereinbefore.

It is deemed unnecessary to describe in detail the flow of high pressure make-gas when the total volume of high pressure make-gas is less than the total required in both the pretreater and the low pressure reforming unit but greater than the volume required to maintain the required once-through hydrogen-to-low pressure feed naphtha mol ratio of 0.25 to 3.5:1 in the low pressure reforming unit. As those skilled in the art will recognize the amount of high pressure make-gas required in the pretreater flows through conduit 129 to conduit 6. The balance of the high pressure make-gas flows through conduit 14 to conduit 26. A portion of the pretreater off-gas after scrubbing to remove hydrogen sulfide and/or ammonia, dried or undried, flows through conduit 18 to conduit 26. The amount of scrubbed pretreater off-gas plus the amount of high pressure make-gas flowing from conduit 129 through conduit 14 to conduit 26 is sufficient to maintain the ratio of once-through hydrogen-to-low pressure reforming feed naphtha within the range of 0.25 to 3.5 mols of once-through hydrogen per mol of low pressure reforming feed naphtha. In other words, a naphtha containing more than innocuous concentrations of at least one of sulfur, nitrogen, and arsenic is hydrodecontaminated in the presence of hydrogenation catalyst having hydrodesulfurizing and hydrodenitrogenizing capabilities and in the presence of once-through pretreater hydrogen-containing gas to provide reformer feed naphtha containing not more than innocuous concentrations of sulfur, nitrogen, and arsenic and to provide pretreater gas comprising hydrogen, $C_1$ to $C_4$ hydrocarbons and at least one of ammonia and hydrogen sulfide. The aforesaid once-through pretreater hydrogen-containing gas is a portion of the hydrogen-containing make-gas separated from the high pressure reformer gas. The balance of the hydrogen-containing make-gas separated from the high pressure reformer gas flows to the low pressure reforming zone. At least a portion of the aforesaid once-through pretreater gas is treated to remove ammonia and hydrogen sulfide to provide pretreater extraneous hydrogen-containing gas. At least a portion of the aforesaid pretreater extraneous hydrogen-containing gas is admixed with the aforesaid balance of the hydrogen-containing make-gas separated from the high pressure reformer gas to provide the hydrogen to maintain a ratio of 0.25 to 3.5 mols of once-through hydrogen per mol of low pressure feed naphtha in said low pressure reforming zone.

Those skilled in the art will recognize that hereinbefore has been provided a method of reforming the $C_5$ or $C_6$ to 380° F. fraction of one or more full boiling range naphthas in which at least a portion of the $C_5$ or $C_6$ to 380° F. fraction or the $C_5$ or $C_6$ to 250° F. portion of the $C_5$ or $C_6$ to 380° F. fraction containing innocuous concentrations of sulfur, nitrogen, and arsenic is reformed at a low pressure less than 400 p.s.i.g. Contemporaneously, the balance of the $C_5$ or $C_6$ to 380° F. fraction or the 250° to 380° F. fraction containing innocuous concentrations of sulfur, nitrogen, and arsenic is reformed at a pressure of at least 500 p.s.i.g. The quantity of $C_5$ or $C_6$ to 380° F. or 250° to 380° F. material, i.e., high pressure feed, reformed in the high pressure unit at a pressure of at least 500 p.s.i.g. must be sufficient under the reforming conditions existing therein to produce the quantity of hydrogen as make-gas to meet the requirements of the pretreating unit and the requirements of the low pressure reforming unit. Those skilled in the art will recognize from the foregoing description that (A) all of the high pressure make-gas can flow to the pretreater, that the pretreater off-gas in whole or in part can be treated to remove ammonia and/or hydrogen sulfide and the purified pretreater off-gas in whole or in part used to supply the extraneous hydrogen in the low pressure reforming unit to provide a mol ratio up to 3.5 mols of hydrogen per mol of low pressure feed; (B) a portion of the high pressure make-gas to satisfy the requirements of the pretreater can flow directly to the pretreater, the balance of the high pressure make-gas can flow directly to the low pressure reforming unit in an amount to supply enough hydrogen for a hydrogen-to-low pressure reforming feed mol ratio up to 3.5 to 1; the pretreater off-gas can be purified, i.e., ammonia and/or hydrogen sulfide removed, and at least a portion of the purified pretreater off-gas can flow to the low pressure reforming unit to supply the balance of the hydrogen required for a hydrogen-to-low pressure reforming feed mol ratio up to 3.5 to 1; (C) a portion of the high pressure make-gas sufficient to supply the requirements for hydrogen in the pretreater can flow directly to the pretreater, the balance of the high pressure make-gas can flow to the low pressure reforming unit to supply the required hydrogen for a hydrogen-to-low pressure reforming feed mol ratio up to 3.5 to 1, the pretreater off-gas with or without removal of ammonia and/or hydrogen sulfide and the low pressure reforming off-gas can be delivered (1) to other hydroprocesses, i.e., processes employing hydrogen, (2) to the refinery fuel main, or (3) to be vented.

I claim:

1. In the method of reforming naphtha at a pressure not greater than 400 p.s.i.g. which comprises contacting reforming feed naphtha containing not more than innocuous concentrations of sulfur, nitrogen, and arsenic in at least one low pressure reforming zone with particleform solid platinum-group metal reforming catalyst at a pressure not greater than 400 p.s.i.g., in the presence of at least three mols of hydrogen per mol of low pressure reforming feed naphtha at reforming conditions of temperature and liquid hourly space velocity to obtain low pressure effluent comprising hydrogen, and $C_1$ and heavier hydrocarbons, separating said low pressure effluent into low pressure gaseous fraction comprising hydrogen, and $C_1$ to $C_3$ hydrocarbons, and low pressure condensate comprising $C_4$ and heavier hydrocarbons, the $C_5$ and heavier hydrocarbons of which have a low pressure target octane rating in the range of 85 to 115 (research+3 cc. TEL), and recycling to said low pressure reforming zone at least a portion of said low pressure gaseous fraction to maintain the aforesaid hydrogen-to-low pressure feed naphtha ratio of at least 3, the improvement which comprises in a cyclic manner for an on-stream period during which the amount of carbon deposited on said catalyst does not exceed about 21 percent of the weight of said catalyst and during at least 48 hours (1) in the aforesaid low pressure reforming zone maintaining a low pressure ratio of 0.25 to 3.5 mols of once-through hydrogen per mol of low pressure feed naphtha, (2) returning no portion of the aforesaid low pressure gaseous fraction to the aforesaid low pressure reforming zone, (3) flowing extraneous hydrogen-containing gas to said low pressure reforming zone from a high pressure reforming zone in amount to maintain the aforesaid low pressure ratio of 0.25 to 3.5 mols of once-through hydrogen per mol of low pressure reforming feed naphtha, and (4) regulating the amount of high pressure reforming feed naphtha introduced into at least one high pressure reforming zone to produce the aforesaid extraneous hydrogen-containing gas in amount at least to maintain the aforesaid low pressure ratio, and (5) during an off-stream period regenerating said catalyst having a deposit of carbon of not more than 21 percent; said high pressure reforming feed naphtha containing naphthenes and not more than innocuous concentrations of sulfur, nitrogen, and arsenic, said high pressure reforming feed naphtha being contacted with particleform solid platinum-group metal reforming catalyst at a reforming pressure of at least 450 p.s.i.g. under reforming conditions of temperature and liquid hourly space velocity to produce hydrogen-containing make-gas and to obtain high pressure effluent comprising hydrogen, and $C_1$ and heavier hydrocarbons, separating said high pressure effluent into the high pressure gas comprising hydrogen and $C_1$ to $C_3$ hydrocarbons and high pressure condensate comprising $C_4$ and heavier hydrocarbons of which the $C_5$ and heavier hydrocarbons have a high pressure target octane in the range of 85 to 115 (research+3 cc. TEL), separating the aforesaid high pressure gas into recycle gas and an amount of hydrogen-containing make-gas at a pressure in excess of the pressure in the aforesaid low pressure reforming zone to satisfy the requirements for the aforesaid extraneous hydrogen-containing gas, flowing said recycle gas to the aforesaid high pressure reforming zone, and flowing said make-gas to said low pressure reforming zone.

2. The method set forth and described in claim 1 wherein the low pressure reforming feed naphtha has an end boiling point of about 380° F.

3. The method of claim 1 wherein the high pressure reforming feed naphtha has an end boiling point of about 380° F.

4. The method of claim 1 wherein the low pressure reforming feed naphtha contains $C_5$ hydrocarbons and has an end boiling point of about 380° F.

5. The method of claim 1 wherein the high pressure reforming feed naphtha contains $C_5$ hydrocarbons and has an end boiling point of about 380° F.

6. The method of claim 1, wherein the high pressure reforming feed naphtha is a fraction of full boiling range naphtha, wherein the high pressure reforming feed naphtha has an end boiling point of about 380° F., and wherein the high pressure reforming feed naphtha has an initial boiling point to provide an amount of high pressure reforming naphtha to produce hydrogen-containing make-gas in said high pressure reforming zone in amount to at least satisfy the requirements of said low pressure reforming zone.

7. The method of claim 1 wherein the high pressure reforming feed is a fraction having an end boiling point of about 380° F. of a selected naphtha selected from the group consisting of naphthas having end boiling points of about 380° F. and containing $C_5$ hydrocarbons, naphthas having end boiling points of about 380° F. and containing hydrocarbons having six carbon atoms, and a fraction of naphtha having an initial boiling point of about 250° F. and an end boiling point of about 380° F., and wherein the low pressure reforming feed is the balance of said selected naphtha.

8. The method of claim 1 wherein the high pressure reforming feed is selected from the group consisting of mixtures of hydrocarbons comprising $C_5$ and heavier hydrocarbons having an end boiling point of about 380° F., mixtures of hydrocarbons comprising $C_6$ and heavier hydrocarbons having an end boiling point of about 380° F., and mixtures of hydrocarbons having an end boiling point of about 380° F., wherein the low pressure reforming feed is selected from the group consisting of a mixture of hydrocarbons comprising $C_5$ and heavier hydrocarbons having an end boiling point of about 380° F., a mixture of hydrocarbons comprising $C_6$ and heavier hydrocarbons having an end boiling point of about 380° F., and a mixture of hydrocarbons having an end boiling point substantially below about 380° F., said high pressure reforming feed being in amout to produce hydrogen-containing make-gas in said high pressure reforming zone in amount to at least satisfy the requirements of said low pressure reforming zone, said low pressure reforming feed being the balance of the mixture of hydrocarbons from which said high pressure reforming feed is selected, and wherein the platinum-group metal reforming catalyst in the low pressure reforming zone and in the high pressure reforming zone comprises about 0.35 to about 0.6 percent by weight of platinum on an alumina support.

9. The method set forth in claim 1 wherein naphtha containing more than innocuous concentrations of at least one of sulfur, nitrogen, and arsenic is hydrodecontaminated in the presence of hydrogenation catalyst having hydrodesulfurizing and hydrodenitrogenizing capabilities and in the presence of once-through pretreater hydrogen-containing gas to provide reformer feed naphtha containing not more than innocuous concentrations of sufur, nitrogen, and arsenic and to provide pretreater gas comprising hydrogen, $C_1$ to $C_4$ hydrocarbons, and at least one of ammonia and hydrogen sulfide, wherein the aforesaid once-through pretreater hydrogen-containing gas is substantially all of the hydrogen-containing make-gas separated from the high presure gas, wherein at least a portion of the aforesaid pretreater gas is treated to remove ammonia and hydrogen sulfide therein to provide pretreater extraneous hydrogen-containing gas, and wherein said pretreater extraneous hydrogen-containing gas flows to said low pressure reforming zone to maintain therein a ratio of 0.25 to 3.5 mols. of once-through hydrogen per mol. of low pressure feed naphtha.

10. The method set forth in claim 1 wherein naphtha containing more than innocuous concentrations of at least one of sulfur, nitrogen, and arsenic is hydrodecontaminated in the presence of hydrogenation catalyst having hydrodesulfurizing and hydrodenitrogenizing capabilities and in the presence of once-through pretreater hydrogen-containing gas to provide reformer feed naphtha containing not more than innocuous concentrations of sulfur, nitrogen, and arsenic and to provide pretreater gas comprising hydrogen, $C_1$ to $C_4$ hydrocarbons, and at least one of ammonia and hydrogen sulfide, wherein the aforesaid once-through pretreater hydrogen-containing gas is a portion of the hydrogen-containing make-gas separated from the high pressure gas, wherein the balance of the hydrogen-containing make-gas separated from the high pressure gas flows to the low pressure reforming zone, wherein at least a portion of the aforesaid pretreater gas is treated to remove ammonia and hydrogen sulfide therein to provide pretreater extraneous hydrogen-containing gas, wherein at least a portion of said pretreater extraneous hydrogen-containing gas in admixture with the aforesaid balance of the hydrogen-containing make-gas separated from the high pressure gas provides the hydrogen to maintain a ratio of 0.25 to 3.5 mols. of once-through hydrogen per mol. of low pressure feed naphtha in said low pressure reforming zone.

11. The method set forth in claim 1 wherein naphtha containing more than innocuous concentrations of at least one of sulfur, nitrogen, and arsenic is hydrodecontaminated in the presence of hydrogenation catalyst having hydrodesulfurizing and hydrodenitrogenizing capabilities and in the presence of once-through pretreater hydrogen-containing gas to provide reformer feed naphtha containing not more than innocuous concentrations of sulfur, nitrogen, and arsenic and to provide pretreater gas comprising hydrogen, $C_1$ to $C_4$ hydrocarbons, and at least one of ammonia and hydrogen sulfide, wherein the aforesaid once-through pretreater hydrogen-containing gas is a portion of the hydrogen-containing make-gas separated from the high pressure gas and wherein the balance of the hydrogen-containing make-gas separated from the high pressure gas flows to the low pressure reforming zone to maintain therein a ratio of 0.25 to 3.5 mols. of once-through hydrogen per mol. of low pressure feed naphtha.

12. The method as set forth in claim 9 wherein the naphtha containing more than innocuous concentrations of at least one of sulfur, nitrogen, and arsenic has an end boiling point of about 380° F. and wherein the high pressure reforming feed naphtha has an end boiling point of about 380° F. and comprises $C_5$ and heavier hydrocarbons.

13. The method as set forth in claim 10 wherein the naphtha containing more than innocuous concentrations of at least one of sulfur, nitrogen, and arsenic has an end boiling point of about 380° F. and wherein the high pressure reforming feed naphtha has an end boiling point of about 380° F. and comprises $C_6$ and heavier hydrocarbons.

14. The method as set forth in claim 11 wherein the naphtha containing more than innocuous concentrations of at least one of sulfur, nitrogen, and arsenic has an end boiling point of about 380° F. and wherein the high pressure reforming feed naphtha has an end boiling point of about 380° F. and an initial boiling point of about 250° F.

15. The method as set forth in claim 9 wherein the naphtha containing more than innocuous concentrations of at least one of sulfur, nitrogen, and arsenic has an end boiling point of about 380° F., wherein the high pressure reforming feed naphtha is a portion of the reformer feed naphtha containing not more than innocuous concentrations of sulfur, nitrogen, and arsenic, wherein said high pressure feed naphtha has an end boiling point of about 380° F., and wherein the low pressure reforming feed is the balance of the aforesaid reformer feed naphtha containing not more than innocuous concentrations of sulfur, nitrogen, and arsenic.

16. The method as set forth in claim 10 wherein the naphtha containing more than innocuous concentrations of at least one of sulfur, nitrogen, and arsenic has an end boiling point of about 380° F., wherein the high pressure reforming feed naphtha is a portion of the reformer feed naphtha containing not more than innocuous concentrations of sulfur, nitrogen, and arsenic, wherein said high pressure feed naphtha has an end boiling point of about 380° F. and comprises $C_5$ and heavier hydrocarbons, and wherein the low pressure reforming feed is the balance of the aforesaid reformer feed naphtha containing not more than innocuous concentrations of sulfur, nitrogen, and arsenic and comprises $C_5$ and heavier hydrocarbons.

17. The method as set forth in claim 11 wherein the naphtha containing more than innocuous concentrations of at least one of sulfur, nitrogen, and arsenic has an end boiling point of about 380° F., wherein the high pressure reforming feed naphtha is a portion of the reformer feed naphtha containing not more than innocuous concentrations of sulfur, nitrogen, and arsenic, wherein said high pressure feed naphtha has an end boiling point of about 380° F. and comprises $C_6$ and heavier hydrocarbons, and wherein the low pressure reforming feed is the balance of the aforesaid reformer feed naphtha containing not more than innocuous concentrations of sulfur, nitrogen, and arsenic and comprises $C_6$ and heavier hydrocarbons.

18. The method as set forth in claim 9 wherein the naphtha containing more than innocuous concentrations of at least one of sulfur, nitrogen, and arsenic has an end boiling point of about 380° F., wherein the high pressure reforming feed naphtha is a portion of the reformer feed naphtha containing not more than innocuous concentrations of sulfur, nitrogen, and arsenic, wherein said high pressure feed naphtha has an end boiling point of about 380° F. and wherein the platinum-group metal reforming catalyst in both the low pressure reforming zone and the high pressure reforming zone comprises about 0.35 to about 0.6 percent by weight of platinum on an alumina support.

19. The method as set forth in claim 10 wherein the naphtha containing more than innocuous concentrations of at least one of sulfur, nitrogen, and arsenic has an end boiling point of about 380° F., wherein the high pressure reforming feed naphtha is a portion of the reformer feed naphtha containing not more than innocuous concentrations of sulfur, nitrogen, and arsenic, wherein said high pressure feed naphtha has an end boiling point of about 380° F. and wherein the platinum-group metal reforming catalyst in both the low pressure reforming zone and the high pressure reforming zone comprises about 0.35 to about 0.6 percent by weight of platinum on an alumina support.

20. The method as set forth in claim 11 wherein the naphtha containing more than innocuous concentrations of at least one of sulfur, nitrogen, and arsenic has an end boiling point of about 380° F., wherein the high pressure reforming feed naphtha is a portion of the reformer feed naphtha containing not more than innocuous concentrations of sulfur, nitrogen, and arsenic, wherein said high pressure feed naphtha has an end boiling point of about 380° F., and wherein the platinum-group metal reforming catalyst in both the low pressure reforming zone and the high pressure reforming zone comprises about 0.35 to about 0.6 percent by weight of platinum on an alumina support.

21. A method of reforming light naphtha at a pressure not greater than 400 p.s.i.g. and reforming heavy naphtha at a pressure of at least 500 p.s.i.g. which comprises in a pretreater contacting naphtha comprising naphthenes and paraffins selected from the group consisting of $C_5$ and heavier hydrocarbons having an end boiling point of about 380° F., and $C_6$ and heavier hydrocarbons having an end boiling point of about 380° F. and containing more than innocuous concentrations of at least one of sulfur, nitrogen, and arsenic with hydrogenating catalyst having hydro desulfurizing and hydrodenitrogenizing capabilities in the presence of once-through pretreater hydrogen-containing gas under hydrodecontaminating conditions of temperature, pressure, liquid hourly space velocity, and hydrogen circulation, producing pretreater effluent comprising hydrogen, at least one of ammonia and hydrogen sulfide, and $C_1$ and heavier hydrocarbons, separating said pretreater effluent into (1) pretreater off-gas comprising hydrogen, $C_1$ to $C_3$ hydrocarbons and at least one of hydrogen sulfide and ammonia, (2) $C_4$ and lighter hydrocarbons, (3) high pressure reforming feed comprising high boiling hydrocarbons having an end boiling point of about 380° F., comprising naphthenes, and being in amount at least sufficient to satisfy the hydrogen requirements of the aforesaid pretreater when said high pressure reforming feed is reformed in the presence of platinum-group metal reforming catalyst at a pressure of at least 500 p.s.i.g. under reforming conditions of temperature and liquid hourly space velocity to produce $C_5$ and heavier reformate having an octane rating (research+3 cc. TEL) of at least 100, and (4) low pressure reforming feed comprising the balance of said pretreater effluent, removing at least ammonia from at least a portion of said pretreater off-gas providing extraneous hydrogen in amount up to 3.5 mols of said extraneous hydrogen per mol of said low pressure reforming feed, in a low pressure reforming zone in a cyclic manner for an on-stream period during which the amount of carbon deposited on said catalyst does not exceed about 21 percent of the weight of said catalyst and during at least 48 hours reforming said low pressure reforming feed in the presence of 0.25 to 3.5 mols of once-through hydrogen including said extraneous hydrogen per mol of low pressure reforming feed in the presence of platinum-group metal reforming catalyst under reforming conditions of temperature, liquid hourly space velocity and pressure not greater than 400 p.s.i.g., producing low pressure reforming zone effluent comprising hydrogen, and $C_1$ and heavier hydrocarbons, separating said low pressure reforming zone effluent into low pressure reforming zone off-gas comprising hydrogen and $C_1$ to $C_3$ hydrocarbons and $C_4$ and heavier reformate, returning no portion of the aforesaid low pressure reforming zone off-gas to said low pressure reforming zone or to said pretreater, and during an off-stream period regenerating said catalyst having a deposit of carbon of not more than 21 percent, in a high pressure reforming zone reforming said high pressure reforming feed in the presence of platinum-group metal reforming catalyst and hydrogen under reforming conditions of temperature, liquid hourly space velocity and pressure of at least 500 p.s.i.g., producing high pressure reforming zone effluent comprising hydrogen and $C_1$ and heavier hydrocarbons, separating said high pressure reforming zone effluent into (1) high pressure reformer gas comprising hydrogen and $C_1$ to $C_3$ hydrocarbons and (2) $C_4$ and heavier reformate, separating said high pressure reformer gas into hydrogen-containing high pressure reformer recycle gas and hydrogen-containing high pressure make-gas, returning said high pressure reformer recycle gas to said high pressure reforming zone, and flowing said high pressure make-gas at least to said pretreater.

22. The method of claim 21 wherein the initial boiling point of the said high pressure reforming feed is about 250° F.

23. The method of claim 21 wherein a portion of the aforesaid high pressure make-gas flows directly to the aforesaid low pressure reforming zone to provide up to 3.5 mols of hydrogen per mol of low pressure reforming feed.

24. The method of claim 21 wherein a portion of the aforesaid high pressure make-gas flows directly to the aforesaid low pressure reforming zone, wherein the balance of the aforesaid high pressure make-gas flows to the aforesaid pretreater, and wherein at least a portion of the said extraneous hydrogen flows to said low pressure reforming zone to provide with the aforesaid high pressure make-gas flowing directly thereto 0.25 to 3.5 mols of hydrogen per mol of low pressure reforming feed.

25. The method of claim 21 wherein the high pressure make-gas flows to said pretreater, wherein ammonia is removed from the pretreater off-gas to provide extraneous hydrogen, and wherein said extraneous hydrogen flows to said low pressure reforming zone to provide 0.25 to 3.5 mols of hydrogen per mol of low pressure reforming feed.

References Cited in the file of this patent

UNITED STATES PATENTS

| | | |
|---|---|---|
| 2,931,768 | Mathy et al. | Apr. 5, 1960 |
| 2,965,561 | Carr et al. | Dec. 20, 1960 |

UNITED STATES PATENT OFFICE
CERTIFICATE OF CORRECTION

Patent No. 3,111,481                 November 19, 1963

Philip P. Lifland

It is hereby certified that error appears in the above numbered patent requiring correction and that the said Letters Patent should read as corrected below.

Columns 3 and 4, Table II, first column, line 5 thereof, for "$C_7$ to 380° F. Wilmington" read -- $C_6$ to 380° F. Wilmington --; column 4, line 69, for "40 p.s.i.g." read -- 400 p.s.i.g. --; column 11, line 71, for "this" read -- side --; column 13, lines 20 and 21, for "hydro-contaminating" read -- hydro-decontaminating --.

Signed and sealed this 28th day of July 1964.

(SEAL)

Attest:

ESTON G. JOHNSON                 EDWARD J. BRENNER
Attesting Officer                  Commissioner of Patents